March 12, 1963  J. R. J. VAN DONGEN ET AL  3,081,258
PRODUCTION OF HIGH OCTANE GASOLINES
Filed Dec. 2, 1960
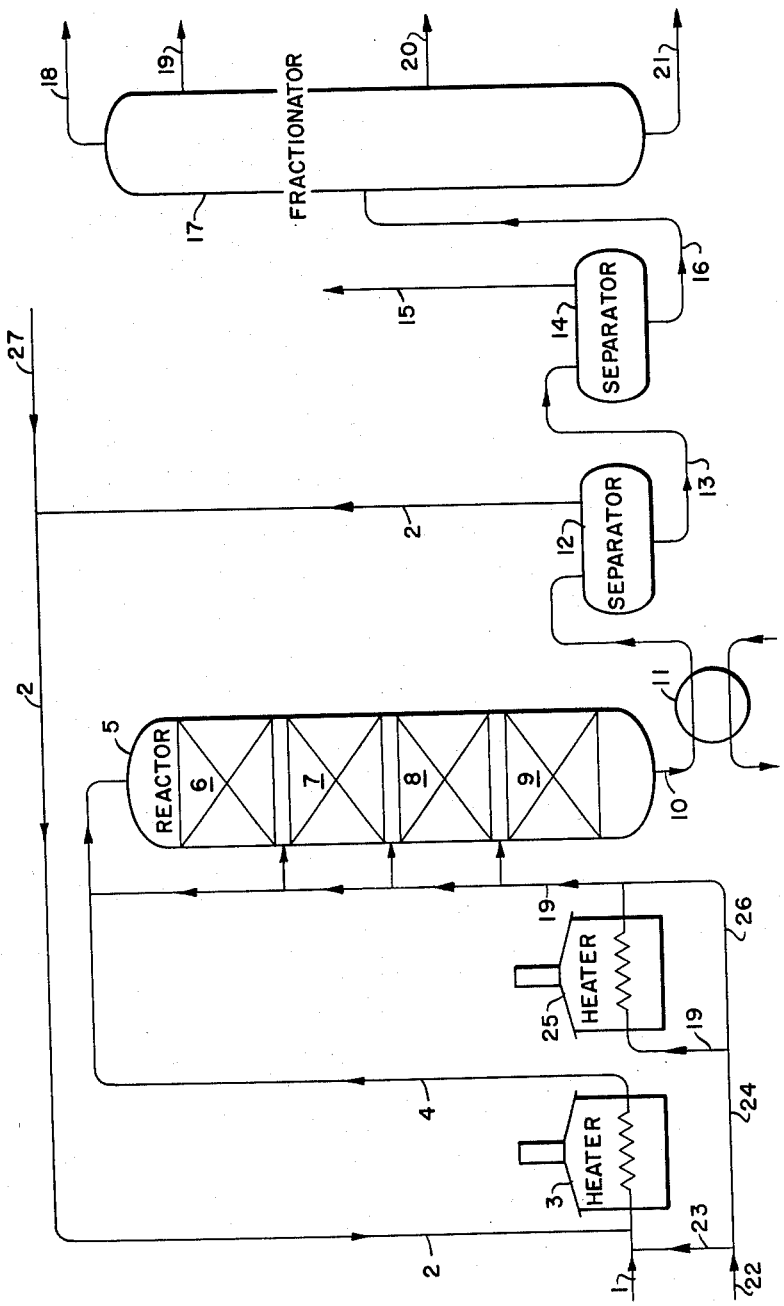
INVENTORS:
JAN R. J. VAN DONGEN
DONALD P. PLUMMER
BY: *Robert C. Clement*
THEIR ATTORNEY United States Patent Office 3,081,258
Patented Mar. 12, 1963

3,081,258
PRODUCTION OF HIGH OCTANE GASOLINES
Jan R. J. van Dongen, The Hague, Netherlands, and Donald P. Plummer, London, England, assignors to Shell Oil Company, New York, N.Y., a corporation of Delaware
Filed Dec. 2, 1960, Ser. No. 73,254
Claims priority, application Great Britain Dec. 4, 1959
6 Claims. (Cl. 208—213)

This invention relates to a process for the production of high octane gasolines or gasoline components.

It is known that higher boiling sulfur bearing hydrocarbon oil fractions may be desulfurized by passing these oil fractions, together with hydrogen or a hydrogen-containing gas, at elevated temperatures and pressures, over a desulfurization catalyst, i.e. a catalyst which, under the reaction conditions applied, is capable of decomposing sulfur compounds present in the feed, but does not cause substantial hydrogenation of aromatics nor substantial hydrocracking of carbon-to-carbon bonds.

Depending upon the kind of material to be desulfurized and on the reaction conditions, the starting material together with hydrogen or with the hydrogen-containing gas, is passed over a catalyst either in vapor phase, in mixed vapor and liquid phase, in liquid phase or in supercritical condition. The so-called trickle technique is particularly suitable for such desulfurization. In this trickle technique the desulfurization feed, partly in liquid phase and partly in vapor phase, is passed co-currently with a hydrogen or a hydrogen-containing gas downward over a fixed bed or a series of fixed beds of catalyst particles. In the trickle technique, relatively low hydrogen-to-oil ratios can be employed. The following conditions are most suitable: pressures of 10–100 atmospheres, temperatures of 250° C.–500° C., space velocity of 0.5–15 kg. of oil per liter of catalyst per hour, and gas-to-oil ratios of 50–600 l. gas per kg. oil.

Suitable desulfurization catalysts are those which contain one or more elements of the sixth and/or eighth group of the periodic system, either as metals or in the form of one or more compounds with one or more other elements and suitably supported on a catalyst carrier. Particularly suitable catalysts are those containing one or more of the elements iron, nickel, cobalt, chromium, molybdenum, or tungsten as metal or in the form of one or more compounds with one or more other elements, e.g. oxygen or sulfur, suitable on an alumina carrier.

Especially preferred desulfurization catalysts comprise aluminum oxide as catalyst carrier and supported thereon 5%–25% by weight cobalt or molybdenum as metals and/or in the form of one or more compounds thereof with one or more of the elements oxygen, sulfur or aluminum, and in which the atomic ratio of cobalt to molybdenum is in the range between 1:20 and 18:20 and preferably between 1:10 and 9:10.

It is known that in the desulfurization of higher boiling fractions a relatively small amount of a product boiling in the gasoline range is formed, which may have a fairly high research octane number. Although such high octane by-products are suitable for incorporation in premium motor gasolines and in aviation gasolines, they show a fairly large difference between the research octane number (F–1) and the motor octane number (F–2), both without the addition of tetraethyl lead (designated as F–1–0 and F–2–0, respectively) or after the addition of 1½ ml. tetraethyl lead per gallon (designated as F–1–1½ and F–2–1½, respectively).

It has now been found that high octane gasoline fractions showing very small differences between the research and motor octane numbers are obtained if the hydrodesulfurization of the higher boiling material is carried out in the presence of added polymer gasoline or of an added polymer gasoline fraction.

A process for producing high octane gasolines or gasoline components according to the present invention therefore comprises contacting a sulfur-bearing hydrocarbon oil having an initial boiling point of at least 170° C. at elevated temperature and pressure with hydrogen or a hydrogen-containing gas and with a desulfurization catalyst, in the presence of an added amount of polymer gasoline or of a polymer gasoline fraction, and recovering one or more gasoline fractions with final boiling points below 220° C.

In the present specification and claims the term "polymer gasoline" is used for the reaction product obtained in the thermal or catalytic polymerization of a starting material containing one or more alkenes with three, four or five carbon atoms per molecule under such conditions that at least 90° by weight of the polymerization product boils below 220° C. The manufacture of these polymer gasolines is described, inter alia, in Progress in Petroleum Technology, Advances in Chemistry, Series No. 5, pp. 83–96, American Chemical Society, Washington, D.C. (1951). Polymer gasolines that have been formed from $C_4$-alkenes are preferred for use in the process according to the present invention, and the most preferred material is a polymer gasoline substantially consisting of isobutene polymers and/or of copolymers of isobutene with unbranched butenes, the molar ratio of isobutene to unbranched butenes being at least one.

The sulfur-bearing hydrocarbon oil to be hydrodesulfurized preferably has an initial boiling point of at least 170° C., and more preferably the initial boiling point is at least 220° C. Thus a gas oil is a quite suitable feed stock.

The most preferred starting materials are those obtained in the catalytic or thermal cracking of sulfur-bearing hydrocarbon oils, because in the hydrodesulfurization of these materials relatively large amounts of gasolines with very high octane numbers, are obtained as by-products. Blends of straight-run and cracked components may also be used. Preferably the sulfur content is above 1% by weight.

The polymer gasoline can be admixed to the hydrocarbon oil to be desulfurized at one or more points situated before the reaction zone, but it is also possible to add all or part of the polymer gasoline at one or more points along the length of the reaction zone.

The ratio of the polymer gasoline to the hydrocarbon oil to be desulfurized can vary within very wide limits.

The invention will now be more fully described with reference to the drawing which diagrammatically illustrates a flow plan in accordance with the invention. The feed to be desulfurized, which can be a blend of a straight-run gas oil and a cat. cracked gas oil, enters through line 1. It is mixed with hydrogen entering via line 2 and then passed through heater 3 and line 4 to the vertical reactor 5 which preferably contains a desulfurization catalyst serially arranged in a number of separate beds 6, 7, 8, 9. The hydrotreated product leaves the reactor through line 10 and passes via cooler 11 to the separator 12 which operates at a pressure substantially equal to that in the reactor 5. The hydrogen-rich gas which separates from the liquid components is recycled through line 2. Fresh hydrogen is added to the system through line 27. The liquid from separator 12 is passed through line 13 to separator 14, which operates at a low pressure. A gas stream rich in hydrogen sulfide is withdrawn from this separator through line 15, in which separation is effected into a number of fractions, withdrawn through lines 18, 19, 20, 21. The high octane gasoline fraction is usually recovered via line 19.

When operating in accordance with the present invention polymer gasoline is supplied via line 22 and admixed to the material to be desulfurized. Thus it may be passed via line 23 to line 1. It is also possible to pass it via line 24 (via the heater 25 and/or the by-pass line 26), to a line 4 between heater 3 and reactor 5 and/or to one or more points between the catalyst beds 6, 7, 8 and 9. Various combinations are of course possible.

The invention will now be further illustrated by means of the following examples.

EXAMPLE I

The normal feed to a hydrodesulfurizer reactor consisted of 957 tons/day of a gas oil feed boiling from 220–360° C. and having a sulfur content of 1.6% by weight. The gas oil consisted of 60% straight-run material and 40% cat. cracked components. To this feed 53 tons/day polymer gasoline were added. The reactor inlet temperature and pressure were 321° C. and 56 kg./cm.² respectively, and the reactor outlet temperature was 362° C. The product from the reactor was cooled to ambient temperature and passed through a high pressure and a low pressure separator. The liquid product from the low pressure separator was fractionated to give a number of fractions, viz. a gaseous fraction, consisting chiefly of hydrogen sulfide, a gasoline fraction boiling from 105° C. to 205° C. and two heavier fractions, boiling from 180° C. to 270° C. and from 265° C. to 360° C., respectively.

The amounts and properties of the product fractions are given in the following Table I.

*Table I*

| Boiling range of fraction, ° C | 105–205 | 180–270 | 265–360 |
|---|---|---|---|
| Production, t./d | 71 | 163 | 763 |
| Sulfur content, percent by weight | 0.006 | 0.12 | 0.19 |
| Octane numbers: | | | |
| F–1–0 | 82 | | |
| F–2–0 | 79 | | |
| F–1–1½ | 91 | | |
| F–2–1½ | 88.5 | | |

EXAMPLE II

[For comparison]

In a further run the addition of polymer gasoline was omitted, while all other conditions remained essentially unchanged; again four fractions were obtained, viz. a gaseous fraction, a gasoline fraction boiling from 160° C. to 205° C. and two heavier fractions boiling from 220° C. to 265° C. and from 265° C. to 360° C. respectively.

The results are represented in Table II.

*Table II*

| Boiling range of fraction, ° C | 160–205 | 220–265 | 265–360 |
|---|---|---|---|
| Production, t./d | 35 | 148 | 763 |
| Sulfur content, percent by weight | 0.008 | 0.15 | 0.19 |
| Octane numbers: | | | |
| F–1–0 | 64 | | |
| F–2–0 | 58 | | |

In one calculation it has been assumed that the quantity of 71 t./d. gasoline mentioned in Table I of the present application consists of 35 t./d. originating from hydrodesulfurized gas oil and 36 t./d. originating from hydrogenated polymer. These quantities correspond to 46% vol. and 54% vol. respectively.

The gasoline fraction, when carrying out the process with gas oil alone, shows a sensitivity of 6, as will be clear from Table II.

It has further been supposed that the F–1–0 octane number for the hydrogenated polymer gasoline is equal to 92. According to the literature this correlates with a sensitivity of 2.5.

For the mixture, making use of a linear blending calculation, a sensitivity of $$0.46 \times 6 + 0.54 \times 2.5 = 4.11$$

is found.

In another calculation it has been assumed that the hydrogenation of polymer proceeds in a 100% conversion. This would imply that in the present process 88 t./d. gasoline is produced, viz. 37% vol. originating from desulphurized gas oil and 63% vol. originating from hydrogenated polymer.

However, production is only 71 t./d. gasoline. The remainder of 17 t./d. might be found in the fraction mentioned in Table I, which boils in the range of from 180–270° C.

Following this line of thought, the sensitivity of the mixture is equal to $$0.37 \times 6 + 0.63 \times 2.5 = 3.80$$

linear blending once more being supposed.

Thus it can be seen that in the process of the invention gasoline produced from the hydrodesulfurized gas oil or at least the total gasoline obtained has a lower sensitivity than would be expected.

We claim as our invention:

1. In a process for the hydrodesulfurization of high-boiling sulfur-bearing hydrocarbon oils wherein gasoline boiling range hydrocarbons are produced, the improvement which comprises contacting a sulfur-bearing oil having an initial boiling point of at least 170° C. at elevated temperatures and pressures with hydrogen and with a desulfurization catalyst in the presence of a polymer gasoline obtained from the polymerization of alkenes having from 3 to 5 carbon atoms per molecule, and recovering a gasoline fraction with a final boiling point below 220° C.

2. A process according to claim 1, wherein the polymer gasoline has been derived from $C_4$-alkenes.

3. A process according to claim 1, wherein the polymer gasoline is substantially copolymers of isobutene with unbranched butenes, the molar ratio of isobutene to unbranched butene being at least one.

4. A process according to claim 1, wherein the sulfur-bearing hydrocarbon oil has an initial boiling point of at least 220° C.

5. A process according to claim 4 wherein the sulfur-bearing hydrocarbon oil is obtained in the cracking of sulfur-bearing hydrocarbon oils.

6. A process according to claim 4 wherein the sulfur content of the sulfur-bearing hydrocarbon oil is at least 1% by weight.

References Cited in the file of this patent

UNITED STATES PATENTS 2,967,816   Hudson _____ Jan. 10, 1961